June 7, 1932.  A. G. McCALEB  1,861,809
ENGINE CIRCULATING SYSTEM
Filed Feb. 4, 1929  2 Sheets-Sheet 1
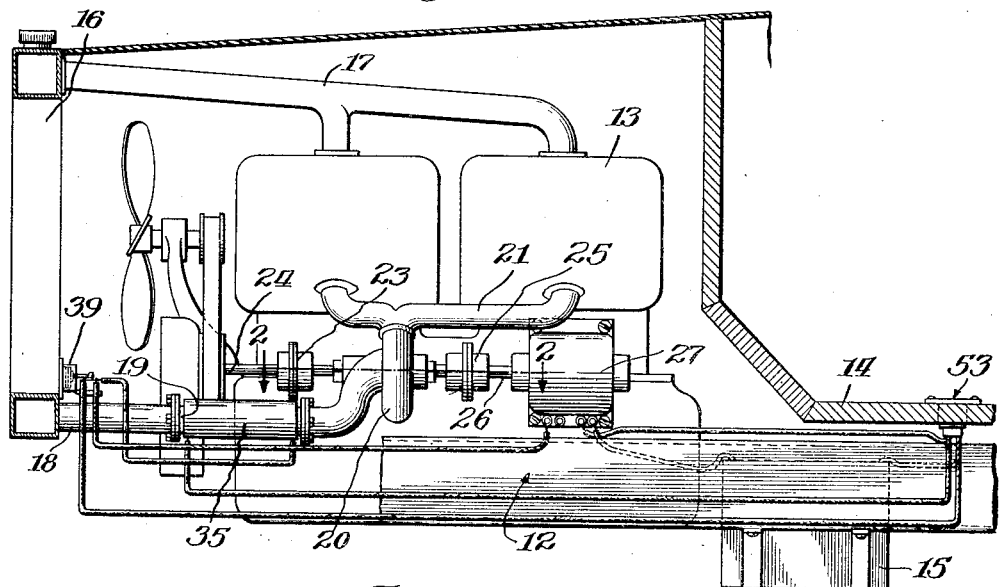
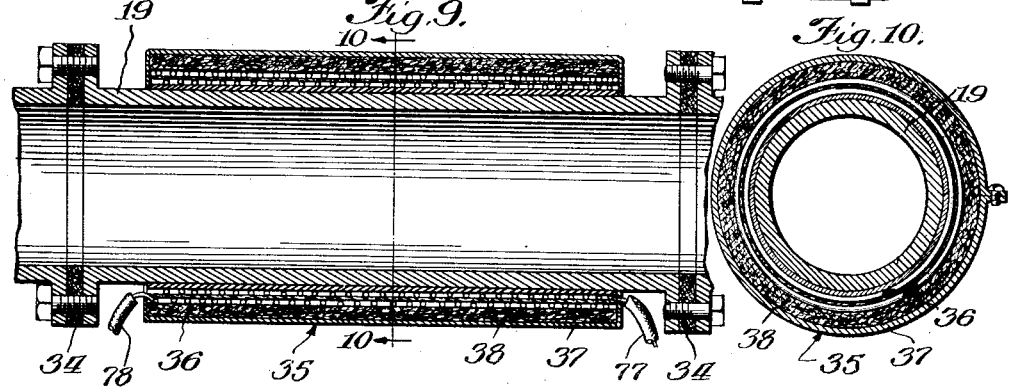
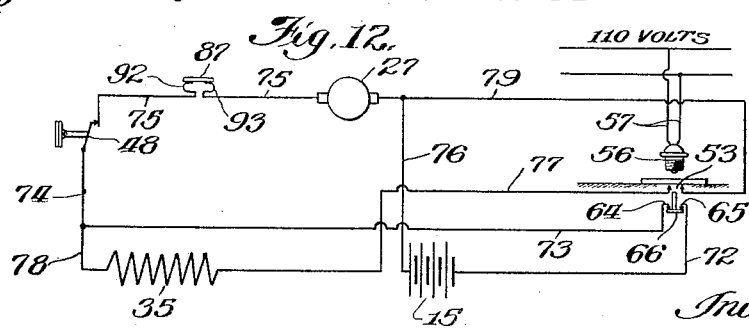
Inventor
Albert G. McCaleb
By William Bradbury
McCaleb + Hinkle Attys.

June 7, 1932.   A. G. McCALEB   1,861,809
ENGINE CIRCULATING SYSTEM
Filed Feb. 4, 1929   2 Sheets-Sheet 2
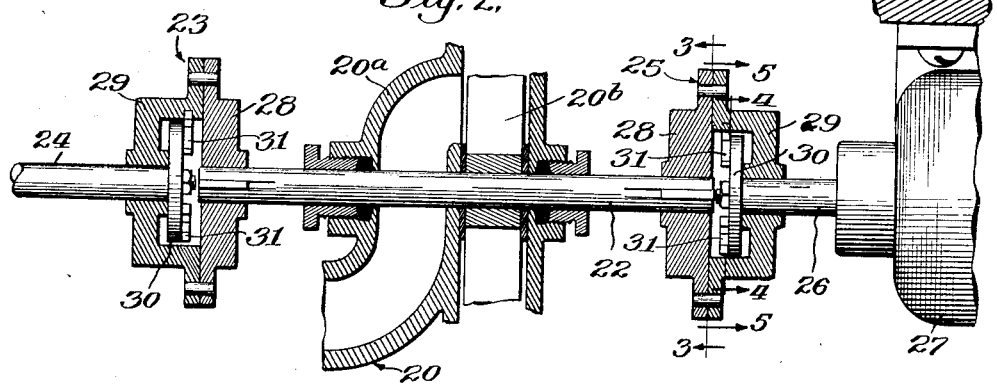
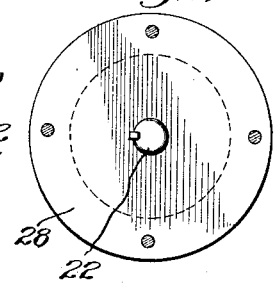
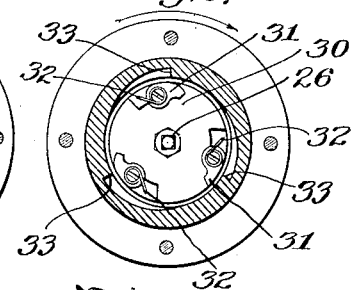
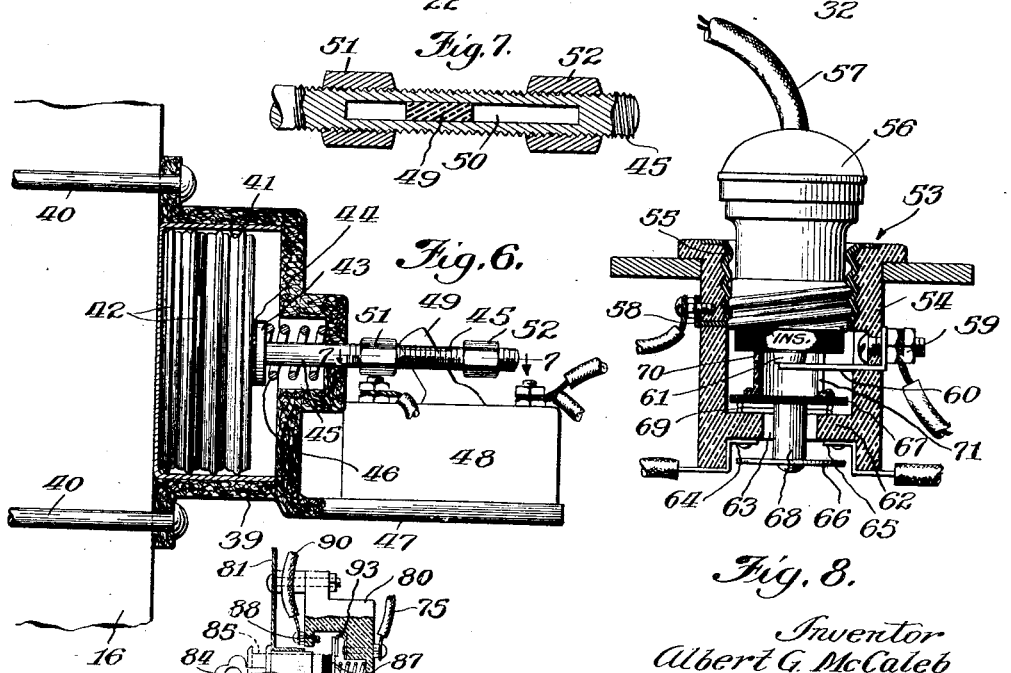
Inventor
Albert G. McCaleb
By Williams Bradbury
McCaleb & Hinkle
Attys.

Patented June 7, 1932

1,861,809

UNITED STATES PATENT OFFICE

ALBERT G. McCALEB, OF EVANSTON, ILLINOIS

ENGINE CIRCULATING SYSTEM

Application filed February 4, 1929. Serial No. 337,227.

My invention pertains to liquid circulating systems of engines, the primary purpose of the invention being to prevent injury to such systems by freezing of the liquid therein contained.

In the accompanying drawings which illustrate the application of my invention to the cooling system of an automotive vehicle internal combustion engine, Fig. 1 is a somewhat diagrammatic side elevational view of an automobile engine equipped with the improvements of the present invention;

Fig. 2 is a sectional view taken in the plane of the line 2—2 of Fig. 1 and looking in the direction indicated by the arrows;

Fig. 3 is a view partly in section and partly in elevation taken in the plane of the line 3—3 of Fig. 2 and looking in the direction indicated by the arrows, this view illustrating one of the elements of one of the centrifugal clutch members which are associated with the circulating pump;

Fig. 4 is a sectional view taken on the line 4—4 of Fig. 2 and looking in the direction indicated by the arrows, this view illustrating the centrifugal clutch dogs in their extended positions;

Fig. 5 is a sectional view taken in the plane of the line 5—5 of Fig. 2 and looking in the direction indicated by the arrows, this view illustrating the centrifugal clutch dogs in the retracted positions which they assume when the disc by which they are carried is not rotating;

Fig. 6 is a side view, partly in section and partly in elevation, of the thermostatic switch mechanism forming a part of the present invention;

Fig. 7 is an enlarged sectional view taken in the plane of the line 7—7 of Fig. 6 and looking in the direction indicated by the arrows;

Fig. 8 is a detail view, partly in section and partly in elevation, of a special socket and switch mechanism which, as will be hereinafter explained, determines which of two circuits is to be controlled by the thermostatic switch mechanism of Fig. 6;

Fig. 9 is an axial sectional view of the resistance heater and the conduit of the engine circulating system with which such heater is associated;

Fig. 10 is a transverse sectional view taken in the plane of the line 10—10 of Fig. 9;

Fig. 11 illustrates a type of ignition lock which may be used upon an automotive vehicle to which the improvements of the present invention are applied; and Fig. 12 is a circuit diagram.

Similar characters of reference refer to similar parts throughout the several views.

In the drawings, reference numeral 12 indicates part of the chassis of an automotive vehicle, 13 indicates an internal combustion engine constituting the power plant of such vehicle, 14 indicates the floorboard of the vehicle and 15 the usual storage battery of relatively low voltage, say six volts, which is supported upon the chassis 12, as shown, or in any other suitable manner.

The engine comprises a cooling system of the circulating liquid type including a radiator 16, manifold 17 for conveying the circulating liquid from the upper portions of the engine water jackets to the upper part of the radiator, conduits 18 and 19 for conveying the circulating liquid from the lower part of the radiator to liquid circulating pump 20, and manifold 21 through which liquid is discharged from the pump 20 into the lower portions of the engine water jackets.

The circulating pump 20 may be of any suitable type, for instance of the now popular centrifugal impeller type comprising a stator 20—a and a bladed rotor 20—b, the liquid being admitted to the rotor chamber near the axis of the rotor and being discharged from the pump in a line substantially tangential to the path of the rotor. The pump rotor is fixed upon and rotates with a shaft 22, which extends through suitably packed bearings in the pump stator.

The left hand end (Figs. 1 and 2) of the shaft 22 connects through a centrifugal clutch 23 with a shaft 24 which is driven in any suitable manner (not shown) from the engine crank shaft. The other end of the shaft 22 is connected through a second centrifugal clutch 25 with the armature shaft 26 of an electric motor 27, which is mounted upon the engine frame, as shown, or in any other suitable manner. The electric motor is preferably so designed that it will operate at the desired speed to drive the pump rotor when the electric motor is connected in circuit with the storage battery 15 which, in present day practice, usually will be a six volt battery. The electric motor likewise is so designed that when connected in series with the resistance heating element presently to be described, the said motor will operate satisfactorily by energy derived from a 110 volt supply outlet usually found in electrically lighted garages and at electrically lighted parking stations.

The centrifugal clutches 23 and 25 are or may be substantially alike, the purpose of the clutch 23 being to permit the pump rotor to be driven from the engine independently of the electric motor when the engine is operating, and the clutch 25 being intended to permit the pump rotor to be driven by the electric motor 27, when the engine and its shaft 24 are at rest and when the electric motor is operating. Therefore, it will be necessary to describe but one of these clutches.

Each clutch comprises a housing formed of two parts 28 and 29 which have their peripheral portions riveted or otherwise secured together as illustrated, the housing element 28 being keyed or otherwise secured, in each instance, to the pump shaft 22. The two part housing provides a chamber within which is located a disc 30 which is rigidly secured upon the adjacent end of a shaft which extends freely through a bearing in the housing section 29, that is to say, the shaft 24 in the case of the clutch member 23 and the motor armature shaft 26 in the case of the clutch 25. Pivotally mounted upon the disc 30 is a plurality of centrifugal dogs 31, 31 with which are associated relatively light springs 32, 32 which tend to hold the dogs in the retracted positions illustrated in Fig. 5, the arrangement being such, however, that when the disc is rotated by its associated shaft to drive the pump rotor, the extremities of the dogs will move out under the influence of centrifugal force to engage shoulders 33, 33 formed in the clutch housing member 29.

The conduit section 19 to which I have previously alluded, preferably is separated from the adjacent pump flange and from the adjacent flange of the conduit section 18, by rubber, asbestos or other poor heat-conducting gaskets 34, so that practically all of the heat supplied to the conduit section 19 will be imparted to the liquid within such conduit section and will not in any large degree be conducted directly to other metallic parts of the circulating system. Disposed around the conduit section is a resistance heater 35 consisting of a suitable number of turns of properly insulated resistance wire 36 located within a sheet metal housing 37, a layer of suitable heat insulating material 38 being interposed between the heating element and the cylindrical wall of the sheet metal shell 35, so that practically all of the heat developed by the resistance element will pass to the pipe section 19 and thence to the liquid therein contained. The electric heater is so designed that when connected in series with the electric motor 27, the electric motor will derive sufficient, but not more than sufficient, electrical energy from a conventional 110 volt source of electrical energy supply.

Located upon the core of the radiator 16, preferably at the lower portion thereof, is a thermostatically operated switch mechanism comprising a housing 39 secured to the radiator core by bolts 40 which may extend through the openings between cells of the conventional radiator core. Located within the thermostat housing 39 is a cup 41 of good heat conducting material, preferably aluminum, the base of this cup being in heat-conducting contact with the radiator core. The thermostat housing 39 preferably is formed of heat insulating material. Located within the heat conducting cup 41 is a plurality of thermostatic wafer cells 42 of a now well known type, which contract under decreased temperature and expand under increased temperature. Associated with these wafer cells is a follower 43, which is preferably provided with a facing 44 of felt or other suitable heat insulating material to prevent undue conduction of heat from the wafer cells to the stem 45 whereon the follower is mounted. A coil spring 46 disposed around the stem 45 and located in a pocket afforded by the housing 39 normally urges the follower and its stem 45 to the left (Fig. 6) but yields when the wafer cells expand under increased temperature.

Mounted upon a shelf 47 forming part of the thermostat housing 39 is a snap switch 48 of any suitable construction, the details of which need not be described. Suffice it to say that the snap switch mechanism comprises an operating arm 49, which is shown in its closed circuit position in Fig. 6, that is to say, the position which it occupies when the wafer cells have contracted under the influence of reduced temperature.

It will be noted that the operating arm 49 of the snap switch extends through an elongated slot 50 which is formed in the follower stem 45. Nuts 51 and 52 threaded more or less tightly upon the stem 45, but nevertheless capable of adjustment thereon, afford abutments for the snap switch operating arm 49.

As before stated, Fig. 6 illustrates the snap switch operating arm in its closed circuit position. When the wafer cells 42 of the thermostat expand pursuant to increased temperature of the radiator core, the nut 51 engages the switch arm 49 and moves it in the clockwise direction until the switch arm has been carried past center, whereupon the switch arm continues to move rapidly, in the well known manner of snap switches, to its open circuit position. Similarly, when the thermostatic wafers contract pursuant to reduced temperature of the radiator core, the nut 52 will engage the snap switch operating arm and move it past center in the counterclockwise direction (Fig. 6) whereupon the arm will snap to its closed circuit position. Within certain limits the temperatures at which the snap switch will open and close the circuit controlled thereby, as well as the temperature range within which the temperature of the radiator core may vary between movements of the snap switch from closed circuit position to open circuit position, and vice versa, may be determined by adjustment of the nuts 51 and 52 upon the stem 45.

The thermostat preferably is designed to cause the snap switch to close the circuit controlled thereby when the temperature of the lower part of the radiator core is at or somewhat above the freezing point of the liquid in the circulating system and to open the said circuit when the temperature of the radiator core has slightly exceeded the temperature at which the circuit was closed.

Located at any convenient point, preferably upon the floorboard of the vehicle, is a combined receptacle and switching mechanism indicated as a whole by reference numeral 53. The member 53 comprises a housing 54 of insulating material, which conveniently may be fitted into an opening in the floorboard. Disposed in the upper portion of the housing 54 is a metal sleeve 55 adapted to co-operate with the threads of a plug member 56 of an electrical extension 57. As is usual in sockets, the sleeve 55 is provided with a terminal 58. Housing 54 carries a second terminal 59 in contact with a spring 60 which is adapted to make yielding contact with the central or insulated terminal 61 of the plug 56 when the latter is in the position shown in Fig. 8.

It will be noted that the housing 54 is provided with a partition 62 which is centrally apertured at 63. Located on the under side of the partition is a pair of contacts 64 and 65. Adapted to establish electrical contact between the contacts 64 and 65 is a metal plate or disc 66 which is fixed upon the lower end of a member of insulating material comprising a disc 67 and a stem 68 extending through the aperture 63 of the housing partition. A coil spring 69 acting between the disc 67 and partition 62 at all times tends to urge the conducting plate or disc 66 into engagement with the contacts 64 and 65. Fixed upon the upper face of the disc 67 is a hollow cylindrical member 70, the upper end of which is adapted to receive the central or insulated contact of the plug 56 and to bear against the insulation encircling such central or insulated contact. It will also be noted that the member 70 is slotted at 71 to accommodate the spring contact 60 and to permit vertical movement of the member 70 independently of such spring contact.

By virtue of the construction just described, the terminals 58 and 59 are electrically connected with the conductors of the extension 57 when the plug 56 is in the position shown in Fig. 8. Under these conditions, electrical connection between the contacts 64 and 65 is broken due to the fact that the plug 56, by its engagement with the member 70, holds the conducting plate or disc 66 in the position shown in Fig. 8 against the pressure of spring 69. However, when the plug 56 is removed, the spring 69 holds the conducting plate or disc 66 in engagement with the contacts 64 and 65 and thus establishes electrical connection between the same.

Let us assume that the plug 56 is disconnected from the receptacle and switch mechanism 53, as will be the case when the vehicle is in use, and that the engine 13 is warm and operating. Under these conditions, the circulating pump 20 will be driven from and by the engine crank shaft through the agency of the shaft 24 and the centrifugal clutch 23. Under these conditions, the thermostatically controlled snap switch will maintain the circuit of motor 27 open, wherefore said motor will be at rest, the centrifugal clutch 25 under these conditions permitting the pump shaft 22 to rotate independently of the motor armature shaft 26.

Now let us assume that the day is cold and that the vehicle is left at the curb. The circulating pump 20 will, of course, cease to operate upon the stopping of the engine. The temperature of the liquid in the circulating system will fall,—that in the radiator and particularly that in the lower portion of the radiator will experience quite a rapid reduction in temperature. However, when the temperature of the liquid in the lower part of the radiator approaches the freezing point of the liquid, the thermostatic wafers 42, 42, responding to the temperature of the lower portion of the radiator, will have collapsed to permit the operating arm of the snap switch to move to its circuit closing position, that is to say, the position shown in Fig. 6. As soon as this occurs, a circuit for the electric motor 27 will be closed from battery 15 through conductor 72, contact 65, conductor disc 66, contact 64, conductors 73 and 74, the snap switch 48, conductor 75, the motor 27 and through conductor 76 back to the battery. The motor 27 will thereupon commence to operate and will drive the circulating pump through the agency of centrifugal clutch 25, the centrifugal clutch 23 functioning under these conditions to permit the circulating pump to be operated independently of the shaft 24 of the engine.

The circulation of the liquid with the engine at rest will be beneficial for at least two principal reasons. In the first place, it requires a lower temperature to freeze a given liquid when in circulation than it does to freeze such liquid when at rest. Moreover, the liquid in the radiator, and more particularly the liquid in the lower part of the radiator, cools off much more rapidly than does the liquid in the water jackets of the engine. Frequently the water in a radiator will freeze when a vehicle is standing at the curb on a cold day, even though that part of the liquid contained in the water jackets is actually warm, or at any rate has a temperature well above its freezing point. This is, of course, due to the residual heat of the engine cylinders and associated parts.

By establishing and maintaining a circulation of the liquid after the liquid in the lower part of the radiator cools off to the danger point, I am enabled to prevent the liquid from freezing in any part of the system until after all of the residual heat of the motor has been exhausted and until the temperature of the liquid as a whole has been reduced to the point where circulation will not suffice to prevent its freezing. The circulating system of a vehicle left at the curb for a reasonable time, even on a very cold day, ordinarily will be adequately protected by the circulation of the liquid in the manner just described.

When the vehicle is to be left for a considerable period of time in an unheated garage or parking space where electrical energy is available, the extension 57 and plug 56 will be used to supply energy to the motor 27 and resistance heater 35 when the thermostatically controlled snap switch so determines. With the plug 56 in the position shown in Fig. 8 and with the snap switch 48 in its closed circuit position, a circuit will be established from the plug 56 through terminal 58, conductor 77, heater 35, conductor 78, conductor 74, switch 48, conductor 75, motor 27, conductor 79, terminal 59 and contact spring 60 to the insulated terminal of the plug 56. Under these conditions, that portion of the fluid heated in the conduit 19 of the circulating system will be circulated through the system by the pump 20. When the temperature of the circulating liquid has been raised to a predetermined point, the thermostatically controlled snap switch will function to shut off the supply of energy to heater 35 and motor 27 until the liquid in the lower part of the radiator has again had its temperature reduced to the predetermined danger point, whereupon the thermostatically controlled snap switch will again function to supply energy to the heater 35 and motor 27.

Thus it will be seen that an engine equipped with the improvements of the present invention may, so far as its circulating system is concerned, be safely left in an unheated garage or parking space for an indefinite length of time, even in very cold weather, so long as the plug 56 is in the position shown in Fig. 8 and is connected with a suitable source of electrical energy.

It may sometimes happen that the thermostatically controlled switch 48 is in circuit closing position, and as a consequence the electric motor 27 is driving the circulating pump at a time when the driver desires to start the engine. For various reasons, it is undesirable to have the electric motor 27 functioning to drive the circulating pump at the same time that the circulating pump is being driven by and due to the normal operation of the engine. Therefore, I prefer to have the ignition switch of the engine so constructed that whenever the ignition circuit of the engine is operative, the motor 27 will be put out of commission regardless of the temperature of the engine at the time, the arrangement being such, however, that whenever the ignition circuit is inoperative, the motor 27 will be placed under the control of the thermostatically operated switch 48.

In Fig. 11 I have shown an ignition switch comprising a frame or housing 80 of insulating material, which is mounted upon the instrument board 81 of the vehicle by screws 82 and spacers 83. At 84 is shown a tumbler lock mechanism of conventional or any suitable design, the only essential requirement of the lock being that it comprise a reciprocating cylinder 85 which when unlocked will assume the dotted line position shown in Fig. 11 and which when locked will occupy the full line position of the same figure. Locks having reciprocating cylinders of this kind are known in the art; therefore the one shown in Fig. 11 need not be described in detail.

At its inner end, the reciprocating lock cylinder carries an insulating disc 86 to which is secured a conducting disc 87. A spring 87—a located within a depression in the housing 80 and bearing against the disc 87 at all times tends to urge the lock cylinder outwardly and to move the conducting disc 87 into a position where it establishes electrical connection between contacts 88 and 89 forming part of an ignition circuit, including conductors 90 and 91. The present invention is not concerned with the details of the ignition circuit. Suffice it will to say that when the lock cylinder 85 is unlocked from its housing 84, it is projected by spring 87—a to the dotted line position of Fig. 11, thereby completing the ignition circuit through conductor disc 87 and across contacts 88 and 89. When the ignition circuit is to be rendered inoperative, the lock cylinder is pressed back into the full line position of Fig. 1, and is there retained in a manner well known in the art, until the key is manipulated to release it. Under these conditions, the conducting disc 87 engages spring contacts 92 and 93 to complete the conductor 75, which is one of the current supply leads for the motor 27.

By virtue of the arrangement shown, the motor 27 is placed under the control of the thermostatic switch 48 whenever the ignition circuit is rendered inoperative by the normal manipulation of the ignition lock, but is taken from under the control of the thermostatic switch 48 when the ignition circuit of the engine is rendered operative, by normal manipulation of the ignition lock, prior to starting of the engine.

Having thus illustrated and described my invention, what I claim is new and desire to secure by Letters Patent of the United States is:

1. In an engine, a circulating system comprising a liquid circulating pump, an electric motor, thermostatically controlled means for causing operation of the pump by the electric motor when with the engine at rest the temperature to which the liquid is subjected falls below a predetermined point, means for driving said pump independently of said electric motor when the engine is in operation, and automatic clutches connecting last said means and the electric motor to the pump.

2. In an engine a circulating system comprising a liquid circulating pump, means comprising an over-running clutch for driving the pump from the engine when the latter is operating, an electric motor, means comprising an over-running clutch for driving the pump from the electric motor when the latter is operating, and thermostatic means for maintaining the electric motor in operation after the temperature of the liquid has fallen below a predetermined point.

3. In combination with an internal combustion engine including a liquid circulating system, a pump forming part of said system, a low voltage battery, a low voltage motor for driving the pump, an electric heater adapted when energized to impart heat to the liquid in said system, a thermostatic switch responsive to the temperature of the engine controlling the supply of electrical energy to said motor, means for establishing the motor circuit through said battery and outside of said heater, and means for exciting said motor through said heater from an extraneous source of electrical energy at relatively high voltage.

4. In combination with an internal combustion engine including a liquid circulating system, a pump, an electric motor adapted to drive said pump, an electric heater adapted when energized to impart heat to the liquid in a certain part of said circulating system, a thermostatically controlled switch responsive to the temperature of the circulating system, means adapted for connection with a relatively high voltage source of electrical energy to supply energy to said motor through said heater when the thermostatically controlled switch is closed, said last mentioned means comprising instrumentalities adapted to supply said motor with current from said battery and to exclude said heater from the motor circuit when the said thermostatically controlled switch is closed.

5. In combination with an internal combustion engine comprising a cooling system of the circulating liquid type, an electric heater adapted when energized to impart heat to the liquid in said circulating system, a thermostatically controlled switch, responsive to the temperature of the circulating system, for closing the circuit of said heater when the liquid in the circulating system is in danger of freezing, an ignition switch for said engine, and means for insuring that said heater is inoperative when the ignition circuit of the engine is in operative condition.

6. In combination with an internal combustion engine including a cooling system of the circulating liquid type, a pump for impelling the circulation of liquid in the cooling system, an electric motor for driving said pump, a thermostatically controlled switch adapted to supply energy to said motor when the liquid in the cooling system is in danger of freezing, a switch controlling the ignition circuit of said engine, and means associated with the ignition switch for insuring that said electric motor is not operating when the ignition circuit of said engine is in operative condition.

In witness whereof, I hereunto subscribe my name this 31st day of January, 1929.

ALBERT G. McCALEB.